Dec. 2, 1924.  
J. A. KIMBALL  
ADJUSTABLE AUTO HEADLIGHT  
Filed Oct. 6, 1923

WITNESS:  
E. R. Ruppert

J. A. Kimball  
INVENTOR  
BY Victor J. Evans  
ATTORNEY

Dec. 2, 1924.  
J. A. KIMBALL  
1,517,640  
ADJUSTABLE AUTO HEADLIGHT  
Filed Oct. 6, 1923  2 Sheets-Sheet 2
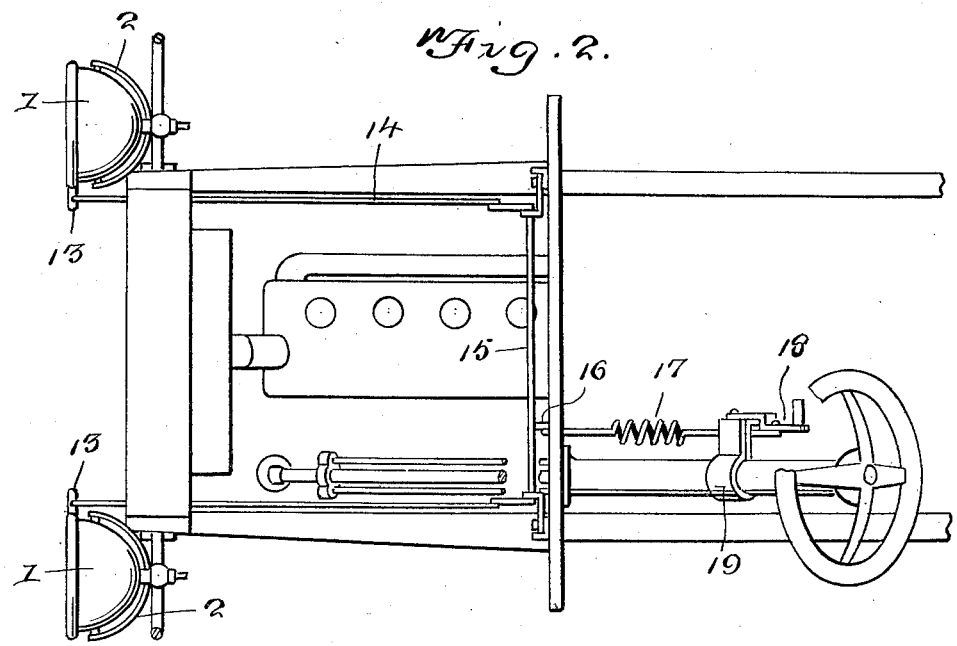
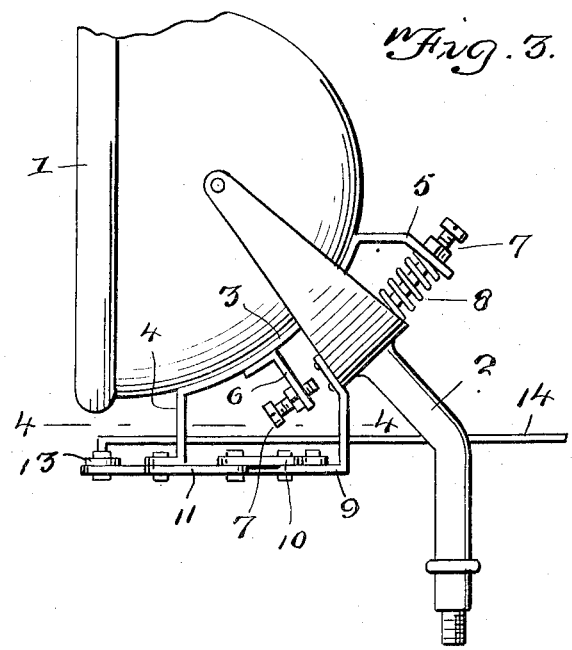
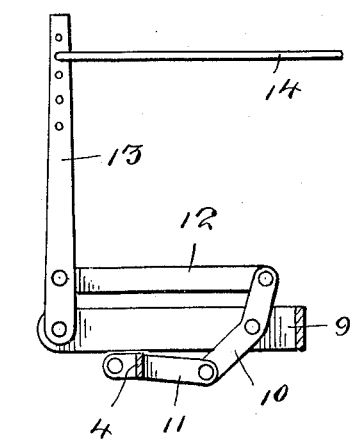
WITNESS:
E. R. Ruppert.
J. A. Kimball
INVENTOR
BY Victor J. Evans
ATTORNEY Patented Dec. 2, 1924.

1,517,640

UNITED STATES PATENT OFFICE.

JOHN A. KIMBALL, OF TAYLORVILLE, ILLINOIS.

ADJUSTABLE AUTO HEADLIGHT.

Application filed October 6, 1923. Serial No. 666,990.

*To all whom it may concern:*

Be it known that I, JOHN A. KIMBALL, a citizen of the United States, residing at Taylorville, in the county of Christian and State of Illinois, have invented new and useful Improvements in Adjustable Auto Headlights, of which the following is a specification.

The general object of this invention is to provide means for permitting the head lamps of a motor vehicle to be tilted about a horizontal axis so that the rays of light can be directed to the road immediately ahead of the vehicle, upon the approach of another vehicle, to prevent blinding of the driver of the other vehicle while affording sufficient illumination for the proper driving of the first vehicle.

Another object of the invention is to provide simple means for adjusting the extent of movement of the lamp and for adjusting its normal running position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a plan view.

Figure 3 is an enlarged elevation of one of the lamps and its supporting means.

Figure 4 is a section on line 4—4 of Figure 3.

Figure 1:
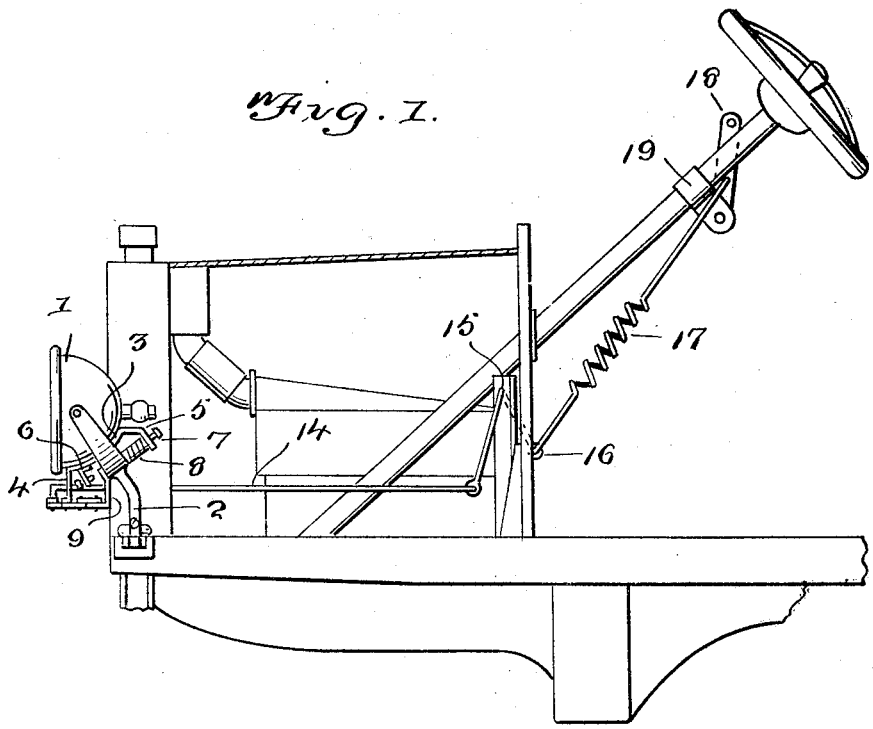
Figure 1 is a sectional elevation of a part of a motor vehicle showing the invention in use.
Figure 5:
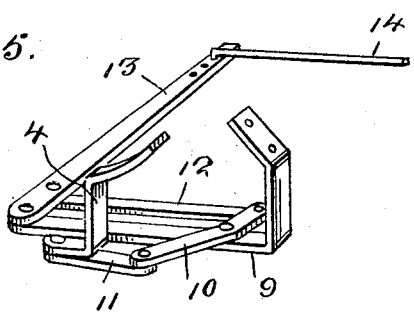
Figure 5 is a perspective view of the parts shown in Figure 4.

In these views, the head lamps are indicated at 1 and their supporting brackets at 2, each bracket being of forked shape with the lamp pivoted therein so that it can be tilted or rocked about a horizontal axis. Each lamp has a strap 3 fastened thereto with its ends bent outwardly to provide the arms 4 and 5. Another arm 6 is connected with the strap and the arms 5 and 6 carry the set screws 7 which have their ends arranged to strike a part of the bracket 2 to act as stops for limiting the movement of the lamp. A spring 8 is arranged on the upper screw 7 and has one end bearing against the bracket 2 and the other against the arm 5 so that the lamp is normally held in a downwardly tilted position so that the rays of light will strike the road immediately ahead of the vehicle. By turning these screws in or out the extent of movement of the lamp can be adjusted and the upper screw will also act to permit the lamp to be quickly and easily adjusted to its proper running position with the road fully illuminated. An L-shaped supporting bracket 9 is bolted to each bracket 2 and a bent lever 10 is pivotally supported by each of the brackets 9. A link 11 connects this lever 10 with the arm 4 and a link 12 connects the other end of the lever 10 with a lever 13. These levers 13 are connected by the rods 14 with the cranked ends of a shaft 15 rotatably supported on the dash of the vehicle and the crank 16 of this shaft is connected by the spring member 17 with an operating lever 18 which is carried by a clamp 19 on the steering post of the vehicle.

It will thus be seen that the spring 8 tends to hold the lamp 1 in lowered position but when the lever 18 is swung upwardly to rock the shaft 15 the levers 13 will move the levers 10, through the link 12, to shove the links 11 forwardly and thus the lamps will be moved upwardly by the arms 4 until the upper set screws strike the bracket. The arrangement of the lever 18 and the spring member 17 will hold the parts in this position which is the running position of the lamps. The springs 8 are held under tension in this position of the lamps and when the lever 18 is swung downwardly these springs 8 will act on the arms 5 to tilt the lamps downwardly. Thus when the operator sees another car approaching him all he has to do is to swing the lever 18 downwardly to permit the springs 8 to tilt the lamps to direct the rays of light upon the road immediately ahead of the vehicle and thus prevent blinding of the other driver. This illumination is sufficient to enable the driver of the first vehicle to stay on the road and keep from running over objects ahead of him. Then when the other vehicle has passed, the lever 18 is swung upwardly to restore the lamps to their running position. The springs 8 and 17 will hold the parts rigid and prevent them from rattling.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a motor vehicle, an upright, a lamp pivoted in the upright, to move about a horizontal axis, a bracket carried by the lamp having projecting parts, set screws carried by the projections for engaging portions of the upright to limit the tilting movement of the lamp, a spring on the upper screw and arranged between the upright and the upper projection for holding the lamp in its lowest position and manually operated means connected with the bracket for moving the lamp to its raised position.

2. In a motor vehicle, an upright, a lamp pivoted in the upright, to move about a horizontal axis, a bracket carried by the lamp having projecting parts, set screws carried by the projections for engaging portions of the upright to limit the tilting movement of the lamp, a spring on the upper screw and arranged between the upright and the upper projection for holding the lamp in its lowest position, manually operated means connected with the bracket for moving the lamp to its raised position, such means consisting of a lever, a link connecting the same to the front part of the bracket, a second lever, a link connecting the same with the first lever and hand operated means connected with the second lever for actuating the same.

3. In a motor vehicle, an upright, a lamp pivoted in the upright to move about a horizontal axis, a bracket carried by the lamp having projecting parts, set screws carried by two of the projecting parts for engaging a part of the upright to limit the movement of the lamp, a spring arranged between the upright and the upper projection for holding the lamp in its lowest position, a supporting bracket carried by the upright, a pair of levers pivoted to the supporting bracket, a link connecting the levers together, a link connecting one lever with the front projection of the bracket on the lamp and manually operated means for moving the second lever.

In testimony whereof I affix my signature.

JOHN A. KIMBALL.